United States Patent
Underwood et al.

(10) Patent No.: US 9,116,069 B2
(45) Date of Patent: Aug. 25, 2015

(54) APPARATUS FOR LEAK TESTING PRESSURIZED HOSES

(75) Inventors: Steve D. Underwood, Somerville, AL (US); Steve G. Garrison, Arab, AL (US); Bobby D. Gant, Huntsville, AL (US); John R. Palmer, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 926 days.

(21) Appl. No.: 12/370,745

(22) Filed: Feb. 13, 2009

(65) Prior Publication Data

US 2010/0206053 A1    Aug. 19, 2010

(51) Int. Cl.
| | |
|---|---|
| *G01M 3/08* | (2006.01) |
| *G01M 3/20* | (2006.01) |
| *G01M 3/22* | (2006.01) |

(52) U.S. Cl.
CPC ............. *G01M 3/207* (2013.01); *G01M 3/22* (2013.01)

(58) Field of Classification Search
CPC ........ G01M 3/28; G01M 3/26; G01M 3/2846
USPC .......................................................... 73/49.1
See application file for complete search history.

(56) References Cited

U.S. PATENT DOCUMENTS

| | | | |
|---|---|---|---|
| 3,949,596 A | 4/1976 | Hawk | |
| 4,282,743 A | 8/1981 | Pickett | |
| 4,507,954 A * | 4/1985 | Boutwell | ...................... 73/40.7 |
| 4,557,139 A | 12/1985 | Cantwell et al. | |
| 4,998,435 A | 3/1991 | Miller et al. | |
| 5,665,903 A | 9/1997 | Moran | |

FOREIGN PATENT DOCUMENTS

| | | |
|---|---|---|
| DE | 20219887 U | 12/2002 |
| EP | 0564312 A1 | 3/1993 |

OTHER PUBLICATIONS

Philippe Chamonard EP0564312 Machine translation, Feb. 3, 1993.*
Intellectual Property Office of Great Britian; Combined Search and Examination Report for Patent Application No. GB1002023.8 (Report issued Mar. 24, 2010).

* cited by examiner

*Primary Examiner* — Laura Martin
*Assistant Examiner* — Alex Devito
(74) *Attorney, Agent, or Firm* — Klintworth & Rozenblat IP LLC

(57) ABSTRACT

A hose-attaching apparatus for leak-testing a pressurized hose may include a hose-attaching member. A bore may extend through the hose-attaching member. An internal annular cavity may extend coaxially around the bore. At least one of a detector probe hole and a detector probe may be connected to the internal annular cavity. At least a portion of the bore may have a diameter which is at least one of substantially equal to and less than a diameter of a hose to be leak-tested.

16 Claims, 5 Drawing Sheets

APPARATUS FOR LEAK TESTING PRESSURIZED HOSES

STATEMENT REGARDING NASA CONTRACT

The invention was made with Government support under Contract Number NAS15-10000 awarded by NASA. The Government has certain rights in this invention.

BACKGROUND OF THE DISCLOSURE

Hoses, such as those used in the space station, airplanes, and in other non-aeronautical embodiments, often need to be leak tested in order to determine if a substance flowing through the hose is leaking. Some conventional apparatus and methods for detecting leaks in hoses utilize a detector probe having a small test opening which must manually be slowly moved over the entire hose to see if any portion of the hose is leaking. In one embodiment of such a detector probe, the test tip may only be one-eighth-of-an-inch. Only a small portion of the hose equivalent to the size of the test tip may be tested at a time. This may take substantial time and may increase the likelihood of missing a portion of the hose being tested. As an example, it took eleven hours to test a three-hundred-and-fifty inch hose for the space station. Moreover, ambient air may dilute the sample being tested by the test tip decreasing test sensitivity and accuracy. Further, it may be difficult for the operator of the probe to keep the test tip at a constant distance from the hose. This may lead to inaccurate readings. Additional problems may be experienced by other conventional apparatus and/or leak-testing methods.

An apparatus and method is needed which may solve one or more problems of one or more of the conventional apparatus and methods for testing hoses for leaks.

SUMMARY OF THE DISCLOSURE

In one embodiment, a hose-attaching apparatus for leak-testing a pressurized hose may be provided. The hose-attaching apparatus may include a hose-attaching member. A bore may extend through the hose-attaching member. An internal annular cavity may extend coaxially around the bore. At least one of a detector probe hole and a detector probe may be connected to the internal annular cavity. At least a portion of the bore may have a diameter which is at least one of substantially equal to and less than a diameter of a hose to be leak-tested.

In another embodiment, a leak-testing apparatus may be provided. The leak-testing apparatus may include a hose-attaching member, a leak-testing hose, and a detector probe. A bore may extend through the hose-attaching member. An internal annular cavity may extend coaxially around the bore. A detector probe hole may be connected to the internal annular cavity. The leak-testing hose may extend through the bore. A diameter of the leak-testing hose may be at least one of substantially equal to and greater than a diameter of at least a portion of the bore. The detector probe may extend into the detector probe hole for detecting a hose-leak of the leak-testing hose within the bore.

In an additional embodiment, a method of testing a hose for a leak may be provided. In one step, a hose-attaching member may be provided. A bore may extend through the hose-attaching member. An internal annular cavity may extend coaxially around the bore. A detector probe hole may be connected to the internal annular cavity. In another step, a leak-testing hose may be provided. The leak-testing hose may have a diameter which is at least one of substantially equal to and greater than a diameter of at least a portion of the bore. In an additional step, a cylindrical portion of the leak-testing hose may be disposed within the bore. In another step, the cylindrical portion of the leak-testing hose disposed within the bore may be tested for a leak using a detector probe extending into the detector probe hole.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
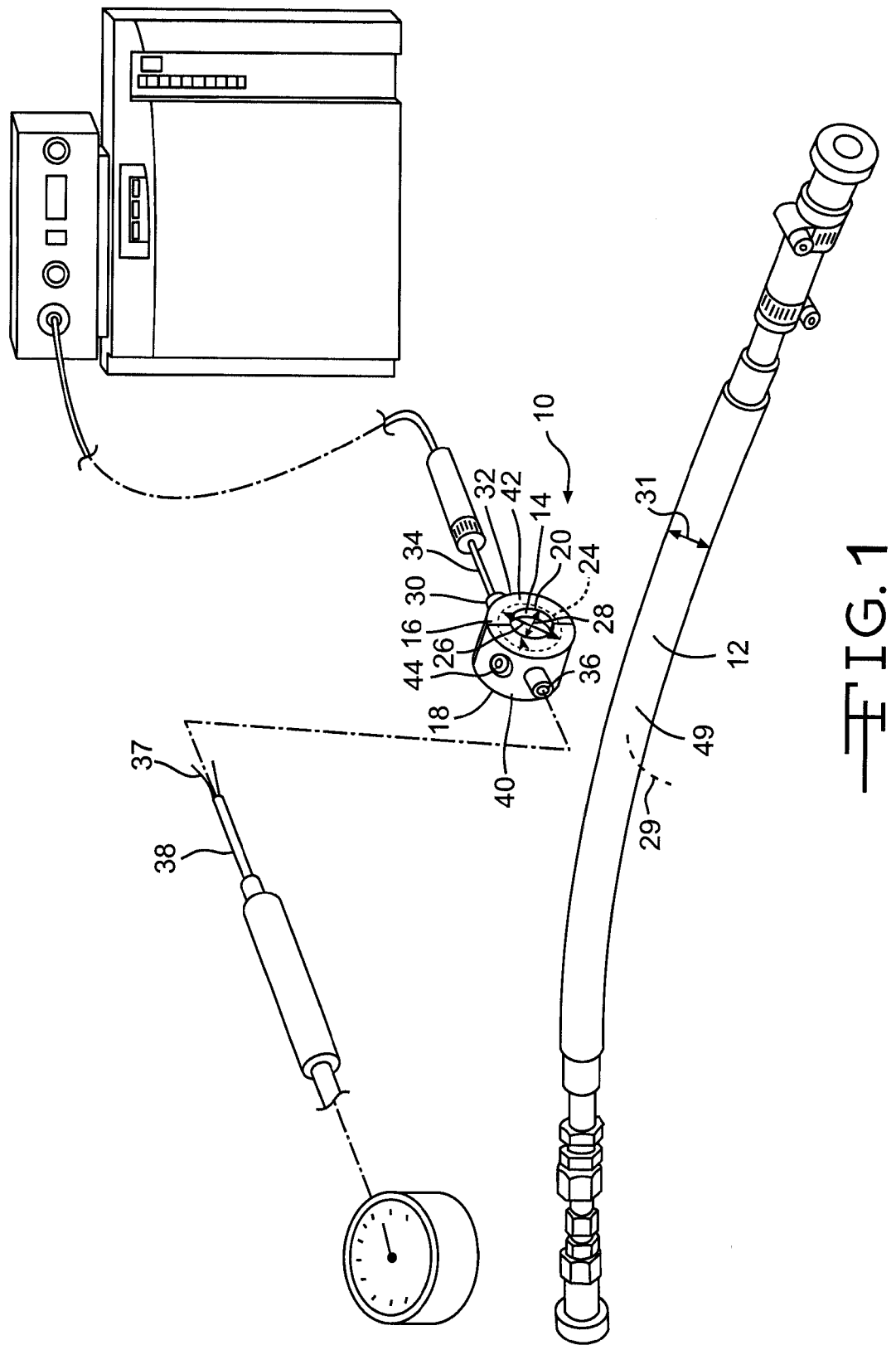
FIG. 1 illustrates a top perspective view of one embodiment of a hose-attaching member for leak-testing a pressurized hose with the hose-attaching member not yet installed on the hose.
Figure 2:
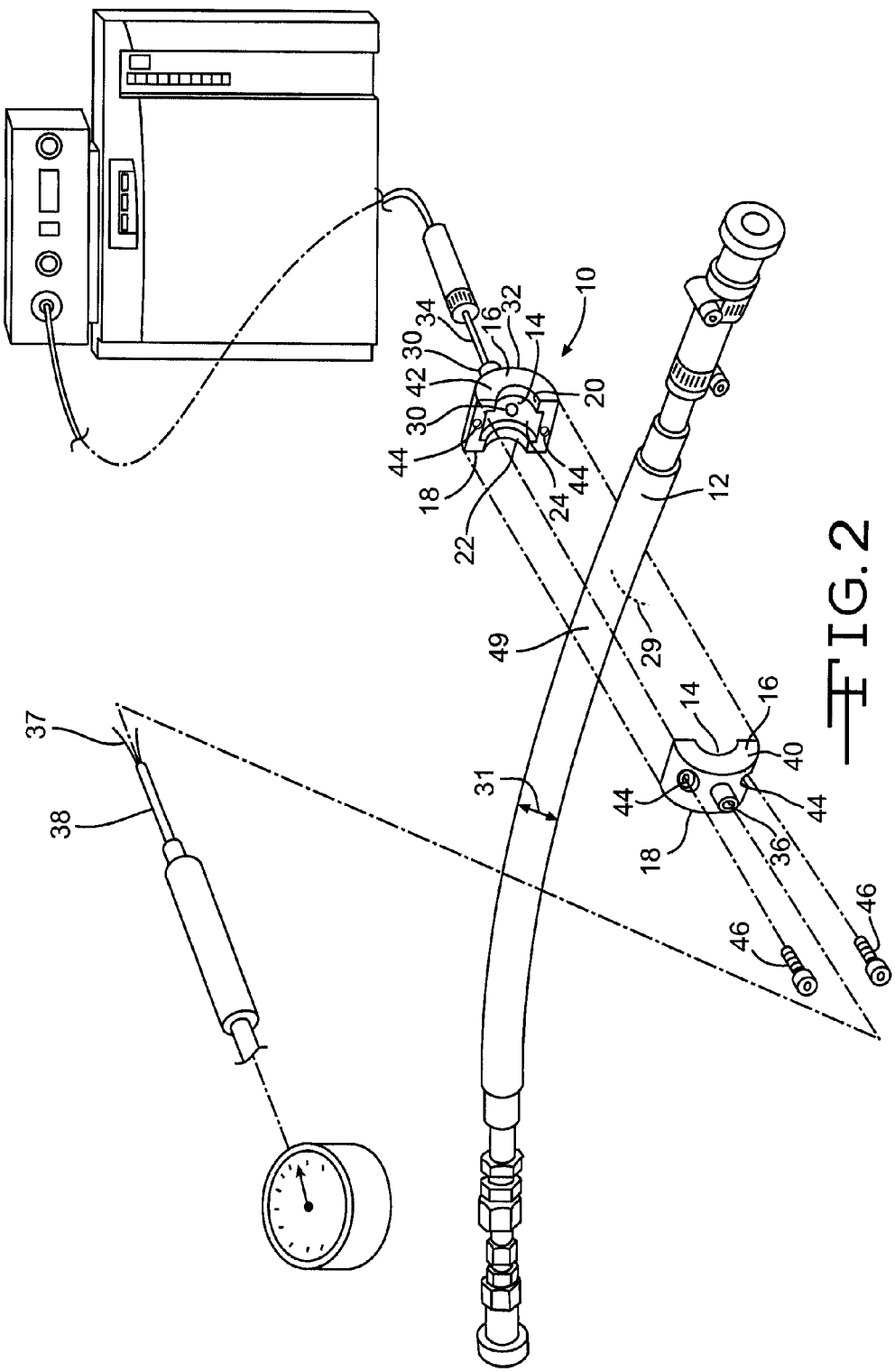
FIG. 2 illustrates a top perspective view of the hose-attaching member of FIG. 1 with detached first and second portions of the hose-attaching member being aligned around the hose.
Figure 3:
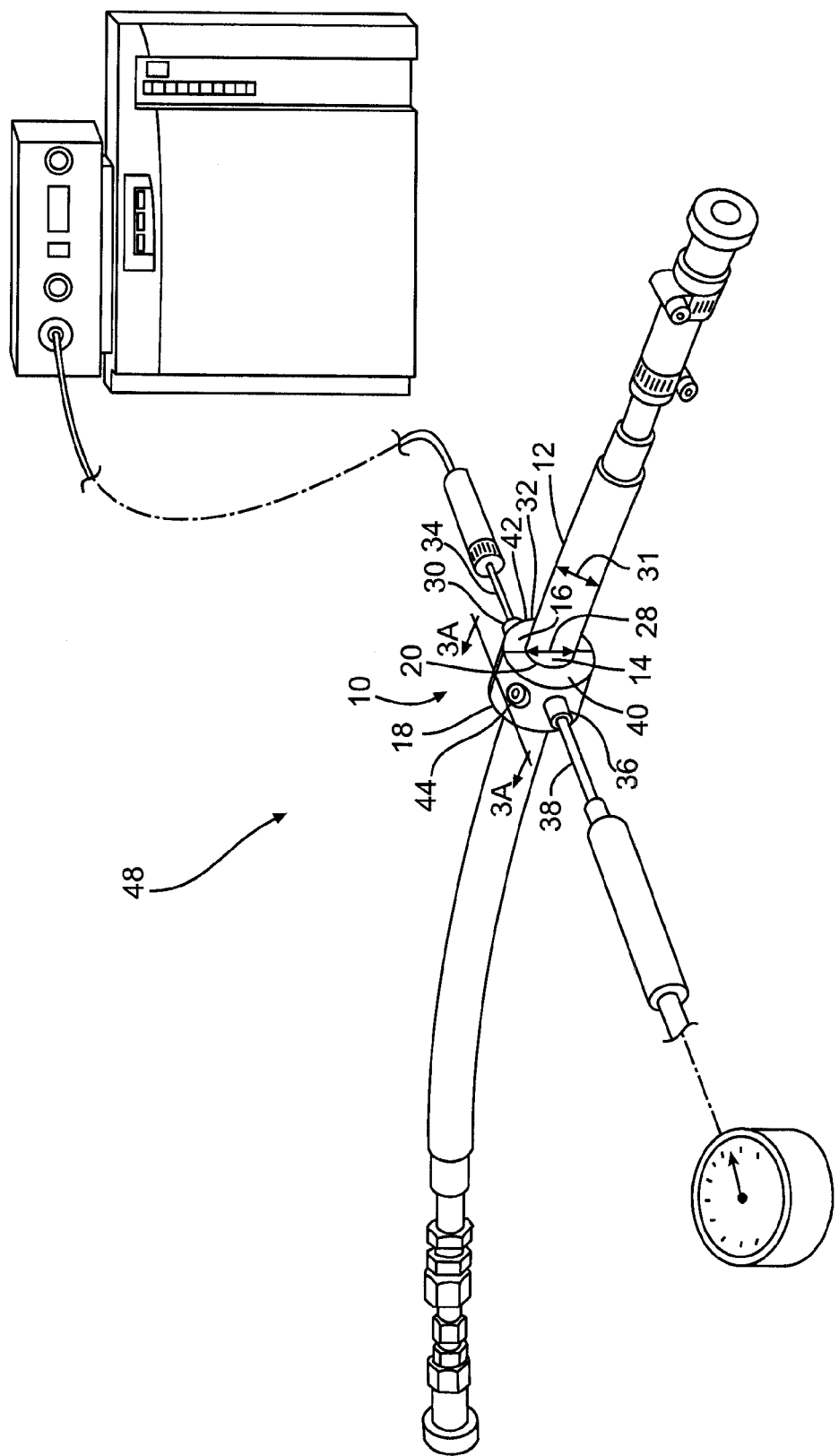
FIG. 3 illustrates a top perspective view of the hose-attaching member of FIG. 2 with the first and second portions attached together around the hose.
Figure 3A:
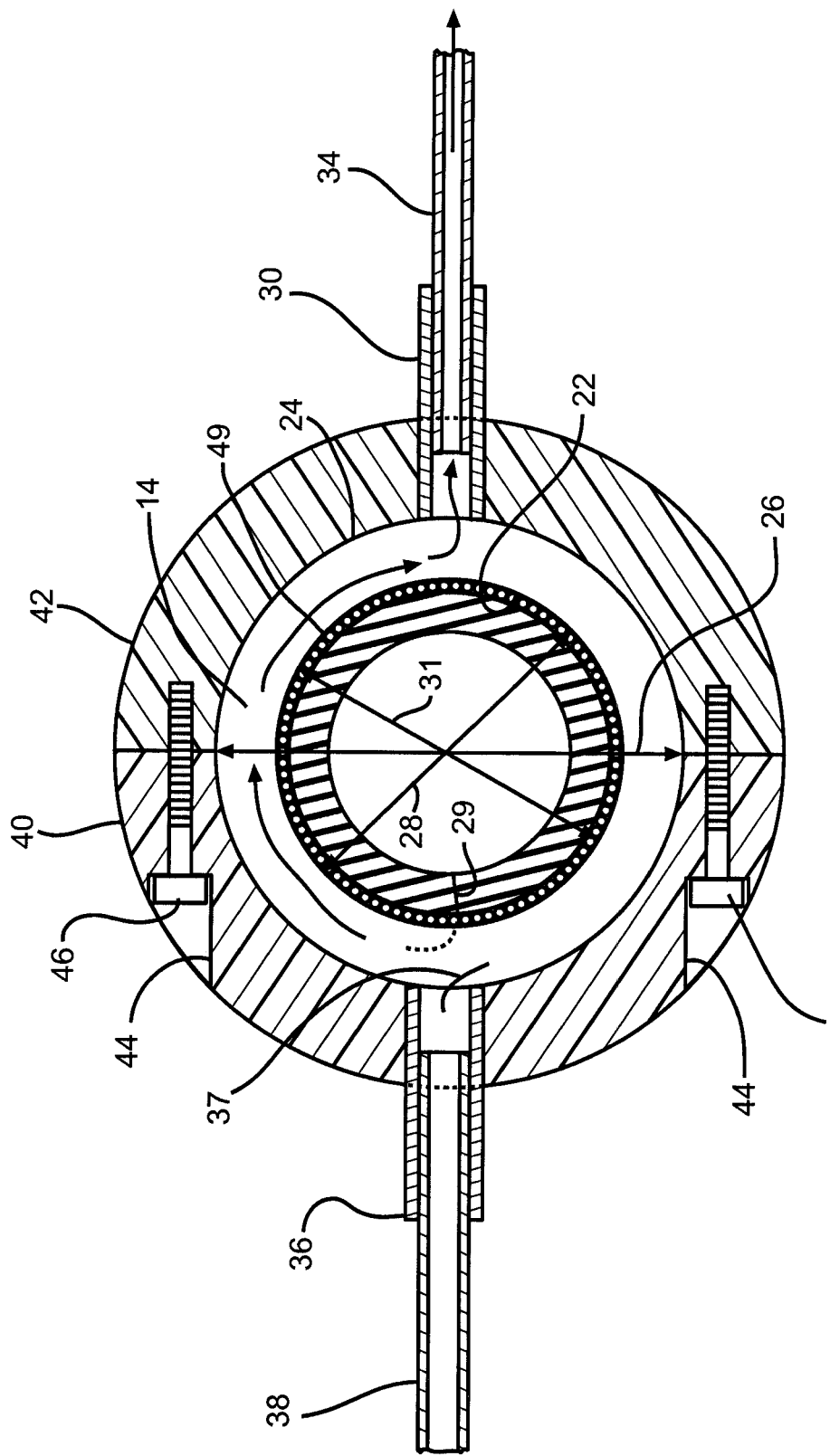
FIG. 3A illustrates a cross-section view through line 3A-3A of the embodiment of FIG. 3.

FIG. 1 illustrates a top perspective view of one embodiment of a hose-attaching member 10 for leak-testing a pressurized hose 12 (also referred to herein as a leak-testing hose) with the hose-attaching member 10 not yet installed on the hose 12. FIG. 2 illustrates a top perspective view of the hose-attaching member 10 of FIG. 1 with detached first and second portions 40 and 42 of the hose-attaching member 10 being aligned around the hose 12. FIG. 3 illustrates a top perspective view of a leak-testing apparatus 48 comprising the hose-attaching member 10 of FIG. 2 with the first and second portions 40 and 42 of the hose-attaching member 10 attached together around the hose 12. FIG. 3A illustrates a cross-section view through line 3A-3A of FIG. 3. As shown in FIGS. 1-3A, the hose-attaching member 10 may be cylindrical and made of Teflon. In other embodiments, the hose-attaching member 10 may be made of varying materials and in other shapes and/or sizes. The hose-attaching member 10 may comprise a bore 14 extending through the hose-attaching member 10. The bore 14 may be cylindrical. The bore 14 may extend between a first outer surface 16 and a second outer surface 18 of the hose-attaching member 10. An internal annular cavity 24 may extend coaxially around the bore 14. The first and second outer surfaces 16 and 18 may have annular hose-abutting lips 20 and 22 for abutting against the hose 12 when the hose 12 is disposed within and through the bore 14. The internal annular cavity 24 may be recessed around the bore 14 between the first and second outer surfaces 16 and 18.

As shown in FIG. 1, the internal annular cavity 24 (shown as hidden) may have a first diameter 26. The first diameter 26 of the internal annular cavity 24 may be greater than a second diameter 28 of a portion of the bore 14 comprising the annular hose-abutting lips 20 and 22. The bore 14 may be adapted to extend around and over the pressurized hose 12. The second diameter 28 of the portion of the bore 14 may be at least one of substantially equal to and less than a diameter 31 of the hose 12. In such manner, the first and second annular hose-abutting lips 20 and 22 may abut against and around the hose 12 when the hose 12 is disposed within the bore 14. The first diameter 26 may be greater than the diameter 31 of the hose 12 being leak-tested so that when the hose 12 is disposed within the bore 14, a hose-leak 29 disposed within the bore 14 may flow between the hose 12 and the internal annular cavity 24.

As shown in FIGS. 1-3A, the hose-attaching member 10 may have at least one of a detector probe hole 30 and a detector probe 34 connected to the internal annular cavity 24. The detector probe hole 30 may extend through the hose-attaching member 10 into the bore 14. The detector probe hole 30 may extend from a third outer surface 32 of the hose-attaching member 10 into the internal annular cavity 24 into the bore 14. The first, second, and third outer surfaces 16, 18, and 32 may each comprise separate surfaces. The first and second outer surfaces 16 and 18 may be parallel. The third outer surface 32 may be cylindrical. The third outer surface 32 may be concentric to the internal annular cavity 24 and the bore 14. The first and second outer surfaces 16 and 18 may be perpendicular to the third outer surface 32 and to the internal annular cavity 24. The detector probe hole 30 may be used to insert a detector probe 34 into the detector probe hole 30 to detect a hose-leak 29 of a hose 12 being tested within the bore 14. The detector probe 34 may comprise a helium mass spectrometer detector probe for detecting a hose-leak 29 comprising a helium hose-leak. In other embodiments, the detector probe 34 may vary for detecting differing types of hose-leaks 29 of varying substances.

The hose-attaching member 10 may have at least one of a calibrated leak device hole 36 and a calibrated leak device 38 connected to the internal annular cavity 24. The calibrated leak device hole 36 may extend through the hose-attaching member 10 into the bore 14. The calibrated leak device hole 36 may extend from the third outer surface 32 of the hose-attaching member 10 into the internal annular cavity 24 into the bore 14. The calibrated leak device hole 36 may be used for inserting the calibrated leak device 38 into the calibrated leak device hole 36 to flow a calibrated leak 37 into the internal annular cavity 24 and the bore 14. The calibrated leak device 38 may comprise a helium calibrated leak device for emitting a calibrated leak 37 comprising a helium leak. In other embodiments, the calibrated leak device 38 may vary for emitting various types of calibrated substance leaks. The detector probe 34 may be calibrated using the calibrated leak device 38.

As shown in FIG. 2, which shows the first portion 40 and the second portion 42 of the hose-attaching member 10 separated apart from one another, the first and second portions 40 and 42 may comprise first and second semi-cylinders having attachment devices 44 and 46 for attaching the first and second portions 40 and 42 together around the hose 12. The attachment devices 44 and 46 may comprise fastener holes and fasteners extending through the fastener holes. In other embodiments, the attachment devices may vary.

As shown in FIGS. 2-3A, when the hose-attaching member 10 is attached to the hose 12, the first and second annular hose-abutting lips 20 and 22 may abut against and around the hose 12 due to the second diameter 28 of the portion of the bore 14 being equal to or less than the diameter 31 of the hose 12. A cylindrical portion 49 of the hose 12 may be disposed within and through the bore 14 of the hose-attaching member 10 in order to test the cylindrical portion 49 of the hose 12 for a leak 29. Due to the first diameter 26 of the internal annular cavity 24 being greater than the diameter 31 of the hose 12 and the first and second annular hose-abutting lips 20 and 22 abutting against and around the hose 12, a hose leak 29 of the hose 12 may flow between the hose 12 and the internal annular cavity 24.

The detector probe 34 may extend into the detector probe hole 30 of the hose-attaching member 10 for detecting, using the internal annular cavity 24, a hose-leak 29 of the cylindrical portion 49 of the hose 12 disposed within the bore 14. The detector probe 34 may comprise a helium mass spectrometer detector probe for detecting a hose-leak 29 comprising a helium hose-leak. In other embodiments, the detector probe 34 may vary in order to detect various types of substance leaks. The calibrated leak device 38 may extend into the calibrated leak device hole 36 of the hose-attaching member 10 for flowing a calibrated leak 37 into the internal annular cavity 24 and the bore 14 in order to calibrate the detector probe 34. The calibrated leak device 38 may comprise a helium calibrated leak device for emitting a calibrated leak 37 comprising a helium leak. In other embodiments, the calibrated leak device 38 may vary in order to emit various types of calibrated substances.

Figure 4:
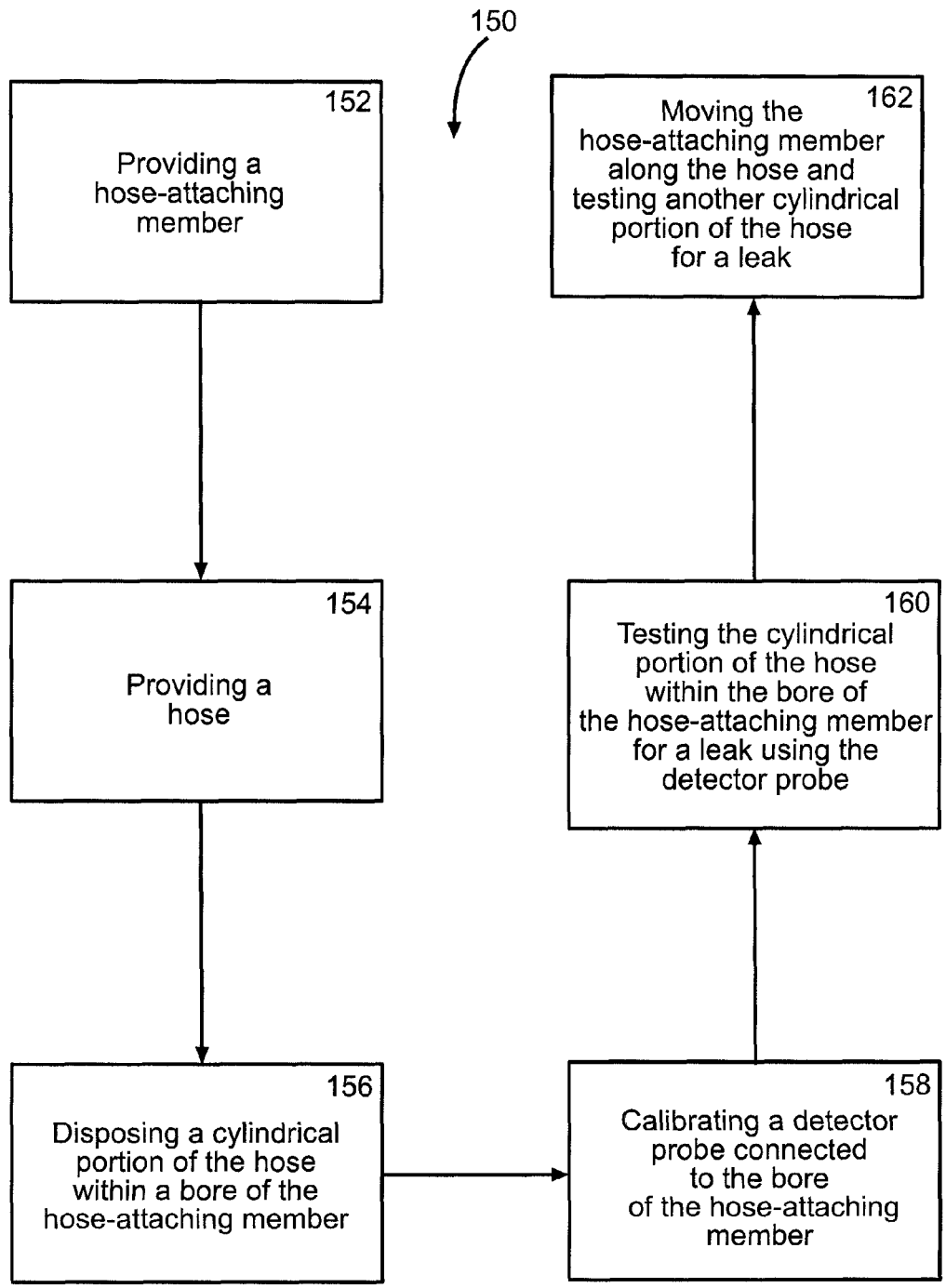
FIG. 4 illustrates a flowchart of one embodiment of a method of testing a hose for a leak.

FIG. 4 illustrates a flowchart of one embodiment of a method 150 of testing a hose 12 for a leak 29. In one step 152, a hose-attaching member 10 may be provided. The provided hose-attaching member 10 may comprise any of the embodiments disclosed herein. In other embodiments, the provided hose-attaching member 10 may vary. The hose-attaching member 10 may have a bore 14 extending through the hose-attaching member 10 between first and second outer surfaces 16 and 18 of the hose-attaching member 10. An internal annular cavity 24 may extend coaxially around the bore 14. The internal annular cavity 24 may be recessed around the bore 14 between the first and second outer surfaces 16 and 18. The internal annular cavity 24 may have a first diameter 26. The first and second outer surfaces 16 and 18 may have annular hose-abutting lips 20 and 22 for abutting against the hose 12 when the hose 12 is disposed within and through the bore 14. A portion of the bore 14 comprising the first and second hose-abutting lips 20 and 22 may have a second diameter 28 which is less than the first diameter 26 of the internal annular cavity 24. The hose-attaching member 10 may have a detector probe hole 30 connected to the internal annular cavity 24 and the bore 14. The detector probe hole 30 may extend through the hose-attaching member 10 into the internal annular cavity 24 and the bore 14.

In another step 154, a hose 12 may be provided having a diameter 31 which is at least one of equal to and greater than the second diameter 28 of the portion of the bore 14. In still another step 156, a cylindrical portion 49 of the hose 12 may be disposed into the bore 14 and the first and second annular hose-abutting lips 20 and 22 may be abutted against and around the hose 12. In one embodiment, step 156 may further comprise attaching first and second portions 40 and 42 of the hose-attaching member 10 together against and around the hose 12.

In another step 158, a detector probe 34 extending into the detector probe hole 30 may be calibrated. The detector probe 34 may comprise a helium mass spectrometer detector probe. In other embodiments, the detector probe 34 may vary. The calibration may be done by flowing a calibrated leak 37 into the internal annular cavity 24 and the bore 14 using a calibrated leak device 38 extending into a calibrated leak device hole 36 connected to the internal annular cavity 24 and the bore 14 of the hose-attaching member 10. The detector probe 34 may be calibrated by measuring the calibrated leak 37 using the detector probe 34 and adjusting the detector probe 34 if adjusting is required. The calibrated leak device 38 may comprise a helium calibrated leak device, and the calibrated leak 37 may comprise a calibrated helium leak. In other embodiments, the calibrated leak device 38 and the calibrated leak 37 may vary.

In an additional step 160, the cylindrical portion 49 of the hose 12 disposed within and through the bore 14 may be tested for a hose-leak 29 using the detector probe 34 extending into the detector probe hole 30. The hose-leak 29 may comprise a helium leak. In other embodiments, the hose-leak 29 may vary in substance. In still another step 162, after testing the cylindrical portion 49 of the hose 12 disposed within the bore 14, the hose-attaching member 10 may be moved relative to the hose 12, and another cylindrical portion of the hose 12 disposed within the bore 14 may then be tested. In such manner, the entire hose 12 may be tested for leaks 29 by continually moving the hose-attaching member 10 relative to the hose 12 until all continuous cylindrical portions 49 of the hose 12 have been tested for leaks 29.

One or more embodiments of the disclosure may reduce one or more problems of one or more of the conventional apparatus and methods for testing hoses for leaks. For instance, one or more embodiments of the disclosure may decrease the time it takes to test an entire hose for leaks by allowing for entire cylindrical portions of the hose to be tested at once. Moreover, one or more embodiments of the disclosure may increase the likelihood that no portion of the hose is missed during the leak-testing. Using one embodiment of the disclosure, the same three-hundred-and-fifty inch hose for the space station which took eleven hours to test using a conventional apparatus and method took only one hour to test. Moreover, the hose-attaching member may increase the test sensitivity and accuracy by reducing the amount of sample dilution by ambient air and by keeping the distance from the detector probe to the hose constant. The hose-attaching member may allow for a leak equal to or greater than 1E-4 sccs helium to be detected in a hose. In other embodiments, leaks of varying sizes may be detected. Still other embodiments of the disclosure may reduce other types of problems of one or more of the conventional testing apparatus and methods.

It should be understood, of course, that the foregoing relates to exemplary embodiments of the disclosure and that modifications may be made without departing from the spirit and scope of the disclosure as set forth in the following claims.

We claim:

1. A system comprising:
   a hose-attaching member comprising a bore extending through the hose-attaching member, an internal annular cavity extending coaxially around the bore, and a detector probe hole connected to the internal annular cavity;
   a leak-testing hose extending through the bore, a diameter of the leak-testing hose being equal to or greater than a diameter of at least a portion of the bore; and
   a detector probe extending into the detector probe hole for detecting a hose-leak of the leak-testing hose within the bore;
   wherein the internal annular cavity is for leak-testing the hose extending through the bore while the internal annular cavity is at atmospheric pressure.

2. The system of claim 1 wherein the hose-attaching member is cylindrical.

3. The system of claim 1 wherein the bore extends between outer surfaces of the hose-attaching member, the outer surfaces having annular hose-abutting lips abutting against the leak-testing hose extending through the bore.

4. The system of claim 3 wherein the internal annular cavity has a diameter which is greater than the diameter of the portion of the bore, wherein the portion of the bore comprises the annular hose-abutting lips.

5. The system of claim 1 wherein the internal annular cavity is recessed around the bore between outer surfaces of the hose-attaching member.

6. The system of claim 1 wherein the detector probe hole extends from an outer surface of the hose-attaching member into the internal annular cavity.

7. The system of claim 1 further comprising a calibrated leak device, wherein the hose-attaching member further comprises a calibrated leak device hole connected to the internal annular cavity, and the calibrated leak device extends into the calibrated leak device hole for calibrating the detector probe.

8. The system of claim 7 wherein the calibrated leak device hole extends from an outer surface of the hose-attaching member into the internal annular cavity.

9. The system of claim 1 wherein the hose-attaching member comprises detachable and attachable portions.

10. The system of claim 9 wherein the detachable and attachable portions comprise semi-cylinders having attachment devices comprising fasteners extending into fastener holes, attaching the portions together around the leak-testing hose.

11. A method of testing a hose for a leak comprising:
    providing a hose-attaching member comprising a bore extending through the hose-attaching member, an internal annular cavity extending coaxially around the bore, and a detector probe hole connected to the internal annular cavity;
    providing a leak-testing hose having a diameter which is equal to or greater than a diameter of at least a portion of the bore;
    disposing a cylindrical portion of the leak-testing hose within the bore; and
    testing the cylindrical portion of the leak-testing hose disposed within the bore for a leak, while the internal annular cavity is at atmospheric pressure, using a detector probe extending into the detector probe hole.

12. The method of claim 11 wherein the disposing step further comprises attaching portions of the hose-attaching member together against and around the leak-testing hose.

13. The method of claim 11 further comprising the step of calibrating the detector probe by flowing a calibrated leak into the internal annular cavity using a calibrated leak device extending into a calibrated leak device hole connected to the internal annular cavity, and calibrating the detector probe by measuring the calibrated leak using the detector probe.

14. The method of claim 11 further comprising the step of, after testing the cylindrical portion of the leak-testing hose disposed within the bore, moving the hose-attaching member relative to the leak-testing hose and testing another cylindrical portion of the leak-testing hose disposed within the bore.

15. The method of claim 12 wherein the disposing step further comprises attaching the portions of the hose-attaching member together against and around the leak-testing hose by extending fasteners into fastener holes of the portions of the hose-attaching member.

16. The method of claim 11 further comprising continuously moving the hose-attaching member along the hose to test the entire hose for leaks.

* * * * *